United States Patent [19]

Wengrovius et al.

[11] Patent Number: 4,667,007
[45] Date of Patent: May 19, 1987

[54] ROOM TEMPERATURE VULCANIZABLE ORGANOPOLYSILOXANE COMPOSITIONS AND METHOD FOR MAKING

[75] Inventors: Jeffrey H. Wengrovius, Scotia, N.Y.; Thomas P. Lockhart, Wallingford, Pa.

[73] Assignee: General Electric Company, Schenectady, N.Y.

[21] Appl. No.: 830,780

[22] Filed: Feb. 19, 1986

Related U.S. Application Data

[63] Continuation-in-part of Ser. No. 788,523, Oct. 21, 1985, abandoned, which is a continuation of Ser. No. 644,891, Aug. 27, 1984, abandoned.

[51] Int. Cl.$^4$ .............................................. C08G 77/06
[52] U.S. Cl. ...................................... 528/18; 524/588; 524/860; 525/104; 528/34; 528/901
[58] Field of Search ..................... 528/18, 901, 34; 524/588, 860; 525/104

[56] References Cited

U.S. PATENT DOCUMENTS

| | | | |
|---|---|---|---|
| 3,671,485 | 6/1972 | Marwitz et al. | 524/323 |
| 4,461,867 | 7/1984 | Suprenant | 528/19 |

*Primary Examiner*—Melvyn I. Marquis
*Attorney, Agent, or Firm*—William A. Teoli; James C. Davis, Jr.; James Magee, Jr.

[57] ABSTRACT

Room temperature vulcanizable organopolysiloxane compositions are provided based on the use of a silanol or alkoxy terminated organopolysiloxane and an effective amount of a diorganotin dicarboxylate and an amine accelerator.

21 Claims, No Drawings

ROOM TEMPERATURE VULCANIZABLE ORGANOPOLYSILOXANE COMPOSITIONS AND METHOD FOR MAKING

CROSS-REFERENCE TO RELATED APPLICATIONS

This application is a continuation-in-part of copending application Ser. No. 788,523, filed Oct. 21, 1985, which is a continuation of application Ser. No. 644,891, filed Aug. 27, 1984, both abandoned, assigned to the same assignee as the present invention and incorporated herein by reference.

BACKGROUND OF THE INVENTION

The present invention relates to room temperature vulcanizable (RTV) organopolysiloxane compositions substantially free of organic solvent having improved shelf stability and corrosion resistance. More particularly, the present invention relates to RTV organopolysiloxane compositions using an effective amount of a particular tin condensation catalyst having organo radicals attached to tin by carbon-tin linkages and whose remaining valences are satisfied by a dicarboxylate radical. For example, di-n-butyltin-diethylmalonate can be used in combination with an amine cure accelerator, di-n-butylamine.

Prior to the present invention, as shown by Brown et al., U.S. Pat. No. 3,161,614, attempts were made to make RTV organopolysiloxane compositions employing a polyalkoxy end blocked diorganopolysiloxane and a monocarboxylic acid metal salt catalyst, such as dibutyltindilaurate. These compositions did not cure satisfactorily. Improved results were obtained by Beers, U.S. Pat. No. 4,100,129, assigned to the same assignee as the present invention, utilizing as a condensation catalyst, a silanol reactive organometallic ester having organo radicals attached to metal through metal-oxygen-carbon linkages. Experience has shown that in instances where silanol reactive organo tin compounds are used as RTV condensation catalysts which have organo radicals attached to tin by tin-oxygen-carbon linkages, the resulting moisture curable compositions are often unstable.

As utilized hereinafter, the term "stable" as applied to the one package polyalkoxy-terminated organopolysiloxane RTV's of the present invention, means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

Further advances in RTV stability have been achieved with the employment of silane scavengers for eliminating chemically combined hydroxy radicals, water, or methanol, as shown by White et al., U.S. Pat. No. 4,395,526, assigned to the same assignee as the present invention and incorporated herein by reference. However, the preparation of these silane scavengers, such as methyldimethoxy-(N-methylacetamide)silane often require special techniques and undesirable by-products can be generated during cure. Further improvements are shown by Dziark for scavengers for one component alkoxy functional RTV compositions and process, U.S. Pat. No. 4,417,042, assigned to the same assignee as the present invention and incorporated herein by reference.

Organic scavengers for the removal of trace amounts of water, methanol and silanol are shown by White et al., Ser. No. 481,524, now U.S. Pat. No. 4,472,551, for One Package, Stable, Moisture Curable Alkoxy Terminated Organopolysiloxane Compositions, filed Apr. 1, 1983, assigned to the same assignee as the present invention and incorporated herein by reference. Additional scavenging techniques for chemically combined hydroxy functional radicals are shown by Lockhart in copending application Ser. No. 481,530, filed concurrently on Apr. 1, 1983, now U.S. Pat. No. 4,467,063.

Although the above discussed techniques for improving the stability of room temperature vulcanizable organopolysiloxane compositions employing a tin condensation catalyst have been found to provide stable, substantially acid-free, curable organopolysiloxanes, a separate organic, inorganic, or organosilicon scavenger for hydroxy functional radicals is required. It would be desirable to make stable room temperature vulcanizable organopolysiloxane compositions utilizing a silanol terminated, or alkoxy terminated polydiorganosiloxane and a tin condensation catalyst which can be used in further combination with an alkoxy silane cross-linking agent and optionally an amine accelerator without the employment of additional materials such as a scavenger for hydroxy functional materials.

The present invention is based on a discovery that stable fast curing RTV compositions can be made which do not require a scavenger for hydroxy functional materials, by utilizing a tin condensation catalyst having the formula $$(R)_2Sn[Y] \qquad (1)$$

where Y is a dicarboxylate group having the formula,

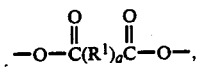

R is selected from $C_{(1-18)}$ monovalent hydrocarbon radicals and substituted $C_{(1-18)}$ monovalent hydrogen radicals, $R^1$ is selected $C_{(1-18)}$ divalent hydrocarbon radicals and substituted $C_{(1-18)}$ divalent hydrocarbon radicals, and a is a whole number having a value of 0 or 1.

Some of the silanol terminated polydiorganosiloxanes which can be used to make the stable, substantially acid-free, moisture curable organopolysiloxane compositions of the present invention have the formula,

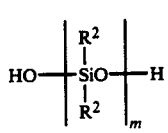

where $R^2$ is a $C_{(1-13)}$ monovalent hydrocarbon radical or substituted monovalent hydrocarbon radical, which is preferably methyl, or a mixture of a major amount of methyl and a minor amount of phenyl, cyanoethyl, trifluoropropyl, vinyl, hydrogen and mixtures thereof, and m is an integer having a value of from about 5 to about 5000.

Polyalkoxy terminated organopolysiloxane which can be used to make the RTV compositions of the present invention has the formula, $$(R^4O)_{3-a}SiO(SiO)_m Si(OR^4)_{3-a}, \quad \text{with } (R^3)_a, R^2, (R^3)_a \text{ substituents and } R^2 \text{ on central Si} \quad (3)$$

where $R^2$ and m are as previously defined, $R^3$ is a monovalent radical selected from $C_{(1-13)}$ hydrocarbon radicals and substituted $C_{(1-13)}$ hydrocarbon radicals, $R^4$ is a $C_{(1-8)}$ aliphatic organic radical selected from alkyl radicals, alkylether radicals, alkylester radicals, alkylketone radicals and alkylcyano or a $C_{(7-13)}$ aralkyl radical and a is as previously defined.

The RTV compositions of the present invention also can contain a cross-linking polyalkoxysilane having the formula, $$(R^4O)_{4-a}Si(R^3)_a \quad (4)$$

where $R^3$, $R^4$ and a are as previously defined.

STATEMENT OF THE INVENTION

There is provided by the present invention, room temperature vulcanizable compositions comprising by weight, (A) 100 parts of organopolysiloxane consisting essentially of chemically combined diorganosiloxy units and terminated with polyalkoxy siloxy units,
(B) 0 to 10 parts of a polyalkoxy silane of formula (4),
(C) 0 part to 5 parts of amine accelerator, and
(D) an effective amount of a tin condensation catalyst of formula (1).

Also included within the scope of the present invention is a method for making room temperature vulcanizable organopolysiloxane compositions which comprises, mixing together under substantially anhydrous conditions, the following ingredients by weight, (i) 100 parts of alkoxy terminated organopolysiloxane of formula (3),
(ii) 0.1 part to 10 parts of polyalkoxysilane of formula (4)
(iii) 0 part to 5 parts of amine accelerator, and
(iv) an effective amount of tin condensation catalyst of formula (1).

In a further aspect of the present invention, there is provided a method for making a room temperature vulcanizable organopolysiloxane composition which comprises, (1) agitating under substantially anhydrous conditions
  (i) 100 parts of silanol terminated polydiorganosiloxane of formula (2),
  (ii) 0.1 to 10 parts of alkoxy silane of formula (4),
  (iii) 0 part to 5 parts of amine accelerator, and
  (iv) 0 to 700 parts of filler
(2) allowing the mixture of (1) to equilibrate to produce polyalkoxy terminated polydiorganosiloxane, and
(3) further agitating the mixture of (2) under substantially anhydrous conditions with an effective amount of a tin condensation catalyst of formula (1).

Radicals included within R of formula (1) are, for example, $C_{(6-13)}$ aryl radicals, halogenated aryl radicals, and alkylaryl radicals such as phenyl, tolyl, chlorophenyl, ethylphenyl and naphthyl; $C_{(1-18)}$ aliphatic, cycloaliphatic radicals, and halogenated derivatives thereof, for example, cyclohexyl, cyclobutyl; alkyl and alkenyl radicals, such as methyl, ethyl, propyl, chloropropyl, butyl, pentyl, hexyl, heptyl, octyl, vinyl, allyl, and trifluoropropyl. R is preferably the same or different $C_{(2-8)}$ alkyl radicals as previously defined. Radicals included within $R^1$ are, for example, methylene, dimethylene, trimethylene, tetramethylene, alkyl substituted dialkylene radical, such as dimethylmethylene, diethylmethylene, α-dimethylethylene, 2,2-dimethylpropylene; etc.; cycloaliphatic radicals, for example, cyclobutylene, cyclopentylene, cyclohexylene, cyclooctylene, etc.; $C_{(6-13)}$ arylene radicals such as phenylene, tolylene, xylene, naphthylene, etc where the aforesaid $R^1$ radicals can be further substituted with monovalent radicals such as halogen, cyano, ester, amino, silyl and hydroxyl. $R^1$ is preferably a $C_{(3-9)}$ dialkyl substituted methylene, such as dimethylmethylene, diethylmethylene, and dibutylmethylene, and particularly diethylmethylene. Radicals included within $R^3$ are all of the $C_{(1-13)}$ monovalent radicals shown for R, where R and $R^3$ can be the same or different. Radicals included within $R^4$ can be more particularly methyl, ethyl, propyl, butyl, etc. benzyl, phenylethyl, 2-methoxyethyl, 2-acetoxyethyl, 1-butan-3-onyl, 2-cyanoethyl.

Some of the tin condensation catalysts included within formula (1) are, for example, di-n-octyltindiethylmalonate, di-n-butyltindiethylmalonate, di-n-octyltinsuccinate, di-n-octyltinoxalate, di-n-butyltinhexahydrophthalate, dimethyltinadipate, di-n-butyltin glutamate, di-N-propyltin(2-cyanoglutarate), di-sec-butyltin adipate, and di-n-pentyltinphthalate.

Included within the cross-linking polyalkoxysilanes of formula (4) are, for example, methyltrimethoxysilane; methyltriethoxysilane, ethyltrimethoxysilane; tetraethoxysilane; vinyltrimethoxysilane; etc.

The preferred range of amine curing accelerator is 0.05 to 5 parts, and particularly 0.1 to 0.3 part of amine curing accelerator, per 100 parts of alkoxy or silanol organopolysiloxane.

Among the amine curing accelerators which can be used in the practice of the present invention are silyl substituted alkyl guanidines having the formula, $$(Z)_g Si(OR^4)_{4-g}, \quad (5)$$

where $R^4$ is a previously defined, Z is a guanidine radical of the formula, $$(R^5)_2N\!\!\diagdown\!\!C\!=\!N\!-\!R^7\!-\!\diagup\!\!(R^6)_2N$$

where $R^7$ is divalent $C_{(2-8)}$ alkylene radical, $R^5$ and $R^6$ are the same or different $C_{(1-8)}$ alkyl radicals and g is an integer equal to 1 to 3 inclusive. In addition, alkyl substituted guanidines having the formula,

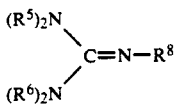

where $R^5$ and $R^6$ are as previously defined and $R^8$ is a $C_{(1-8)}$ alkyl radical, also can be employed. Some of the silyl substituted guanidines included within formula (5) are shown by Takago U.S. Pat. Nos. 4,180,642 and 4,248,993.

In addition to the above substituted guanidines, there can be used various amines, for example, diisobutylamine, di-n-hexylamine, dicyclohexylamine, di-n-octylamine, hexamethoxymethylamine, and silylated amines, for example, δ-aminopropyltrimethoxysilane and methyldimethoxy-d-n-hexylaminosilane. Methyldimethoxy-di-n-hexylaminosilane acts as both a cross-linker and curing accelerator. The primary amines, secondary amines, silylated secondary amines are preferred and secondary amines, and silylated secondary amines are particularly preferred. Silylated secondary amine such as alkyldialkoxy-n-dialkylaminosilanes and silylated alkyl guanidines such as alkyldialkoxyalkylguanidylsilanes as shown above, also are useful as cure accelerators.

In addition to the above-described amine accelerators, there is also included in the practice of the present invention the use of certain sterically hindered diamines which have been found to effect rapid cures of the RTV compositions of the present invention when utilized in effective amounts as previously defined. These nitrogen bases include, for example, di-t-butylethylene diamine (DBEDA), 1,5-diazabicyclo[4.3.0]non-5-ene (DBN), and 1,8-diazabicyclo[5.4.0]undec-7-ene (DBU).

Silanol-terminated polydiorganosiloxanes of formula (2) are well known and preferably have a viscosity in the range of from about 100 to about 400,000 centipoise and more preferably from about 1000 to about 250,000 centipoise when measured at about 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of formula (2) also are well known. For example, hydrolysis of a diorganohalosilane such as dimethyldichlorosilane, diphenyldichlorosilane, methylvinyldichlorosilane, or mixtures thereof, can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined diorganosiloxy units with steam under pressure. Other methods that can be employed to make silanol-terminated polydiorganosiloxanes are more particularly described in U.S. Pat. No. 2,607,792 to Warrick and U.K. Pat. No. 835,790.

In order to facilitate the cure of the RTV compositions of the present invention, the tin condensation catalyst of formula (1) can be utilized at from 0.1 to 10 parts of tin catalyst, per 100 parts of the silanol terminated or alkoxy terminated polydiorganosiloxane, and preferably from 0.1 to 1.0 part, per 100 parts of the polydiorganosiloxane.

Various fillers, pigments, adhesion promoters, etc., can be incorporated in the silanol or alkoxy-terminated organopolysiloxane, such as for example, titanium dioxide, zirconium silicate, silica aerogel, iron oxide, diactomaceous earth, fumed silica, carbon black, precipitated silica, glass fibers, polyvinyl chloride, ground quartz, calcium carbonate, β-cyanoethyltrimethoxysilane, 1,3,5-tris(trimethoxysilylpropyl)isocyanurate, etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention, the room temperature vulcanizable compositions can be made by agitating, for example, stirring under moisture-free conditions, a mixture of materials which can consist of the tin condensation catalyst and the alkoxy terminated polydiorganosiloxane. Optionally, cross-linking polyalkoxysilane and amine accelerator can be used.

In instances where silanol terminated polydiorganosiloxane is used in place of the alkoxy terminated polydiorganosiloxane it is preferred that blending of the filler, for example, fumed silica, the silanol terminated polydiorganosiloxane and the cross-linking polyalkoxysilane be performed in the absence of the tin condensation catalyst. The tin condensation catalyst can be introduced advantageously after the resulting blend has been agitated for a period of about 24 hours at room temperature. It has been found advantageous to introduce the tin condensation catalyst as a mixture with the cross-linking polyalkoxysilane to facilitate the introduction of this tin catalyst into the RTV.

As used hereinafter, the expressions "moisture free conditions" and "substantially anhydrous conditions", with reference to making the RTV compositions of the present invention, mean mixing in a dry box, or in a closed container which has been subjected to vacuum to remove air, which thereafter is replaced with a dry inert gas, such as nitrogen. Temperatures can vary from about 0° C. to about 180° C. depending upon the degree of blending, the type and amount of filler.

A preferred procedure for making the RTV compositions of the present invention is to agitate under substantially anhydrous conditions a mixture of the silanol terminated polydiorganosiloxane or alkoxy terminated polydiorganosiloxane, filler and an effective amount of the tin condensation catalyst. There can be added to the mixture, the cross-linking silane or mixture thereof along with other ingredients, for example, the curing accelerator and pigments.

In order that those skilled in the art will be better able to practice the invention, the following example is given by way of illustration and not by way of limitation. All parts are by weight.

EXAMPLE 1

A mixture of 300 grams of dibutyltin oxide, 193 grams of diethylmalonic acid, and 500 ml. of toluene was refluxed for 1 hour. There was collected 21 grams of water in a Dean Stock trap by azeotropic distillation. The reaction mixture was then filtered while hot and allowed to cool to ambient temperatures. Removal of the solvent in vacuo provided 460 grams (98% yield) of dibutyltin diethylmalonate as a white crystalline solid. The identity of the product was confirmed by NMR, IR and FD-MS analysis.

A base RTV formulation was prepared by thoroughly mixing all the parts of a methyldimethoxysiloxy terminated polydimethylsiloxane having a viscosity of about 40,000 centipoise at 25° C., 0.3 part of dibutylamine, 17 parts of fume silica, 30 parts of a trimethylsiloxy terminated polydimethylsiloxane having a viscosity of 100 centipoise at 25° C. and 1.4 part of β-cyanoethyltrimethoxysilane.

There was added to 100 grams of the above base RTV formulation, 0.35 gram of dibutyltindiethylmalonate and 0.30 grams of methyltrimethoxysilane. The resulting RTV formulation was blended for 15 minutes under substantially anhydrous conditions in a Semco mixer. One half of the RTV was then heat aged for 48 hours at 100° C. and the other half of the RTV was stored at 25° C. The RTV's were evaluated while under substantially anhydrous conditions in sealed containers. Upon exposure to atmospheric moisture, the heat aged RTV and the unaged RTV cured to a tack-free state in 30 minutes.

The following table summarizes the physical properties of the cured products obtained from the aged and unaged RTV's after 12 days of cure where "H" is hardness (Shore A), "T" is tensile (psi), "E" is elongation (%), "M" is modulus (psi).

| RTV (48 H) | H | T | E | M 50% | 75% | 100% |
|---|---|---|---|---|---|---|
| 25° C. | 19 | 246 | 375 | 44.2 | 56.0 | 68.0 |
| 100° C. | 22 | 262 | 382 | 48.4 | 61.1 | 72.9 |

Those RTV's were also found to pass the vapor phase corrosion of copper metal test as described in Military Specification No. 46146A. In addition, the RTV's were found to be non-yellowing.

EXAMPLE 2

A mixture of 161.4 grams of dibutyltin oxide and 100 grams of hexahydrophthalic anhydride was heated to reflux in 100 ml. of toluene for 2 hours. During this time, the dibutyltin oxide dissolved quickly and formed a yellow homogeneous solution. After cooling, the reaction mixture was filtered. The solvent was removed in vacuo and a quantitative yield of a yellow glassy solid was obtained. Based on method of preparation and its NMR spectra the solid was dibutyltin hexahydrophthalate.

An RTV composition were prepared by mixing together under anhydrous conditions 100 parts of a dimethoxymethylsiloxy endcapped polydimethylsiloxane having a viscosity of 20,000 centipoises at 25° C., 1 part of β-cyanoethyltrimethoxysilane, 20 parts of fumed silica, 20 parts of a trimethylsiloxy terminated polydimethylsiloxane having a viscosity of 100 centipoises, 1 part of 1,3,5-tris(trimethoxysilylpropyl)isocyanurate, 0.08 part of di-n-butylamine, 0.25 part of the above di-n-butyltin hexahydrophthalate condensation catalyst and 0.3 part of methyltrimethoxysilane.

A portion of the above RTV composition was allowed to cure under atmospheric moisture over ambient conditions. It had a tack free time of about 20 minutes. Another portion of the RTV composition was heated under sealed conditions for 120 hours at 70° C. The tack free time was found to be 25 minutes when allowed to cure under atmospheric conditions.

EXAMPLE 3

A mixture of 1000 grams of dibutyltin oxide, 587.2 grams adipic acid and 500 ml. of toluene were refluxed for 3 hours. There was obtained 72 grams of water by azeotropic distillation. The reaction mixture was then hot filtered and the solvent was removed in vacuo from resulting light yellow filtrate. After drying, there was obtained 1501 grams of a dibutyltin adipate or a 99.1% yield. The product has a melting point of 128°–130° C. The identity of the product was further confirmed by its NMR spectrum.

An RTV formulation was prepared by mixing together under substantially anhydrous conditions 100 parts of a methyldimethoxysiloxy endcapped polydimethylsiloxane of Example 2, 20 parts of fumed silica, 20 parts of the trimethylsiloxy endcapped silicone oil, 1.4 part of β-cyanoethyltrimethoxysilane, 1 part of 1,3,5-tris(trimethoxysilylpropyl)isocyanurate, 0.3 part of dibutyltin adipate, 0.05 part of di-n-butyl amine and 0.3 part of methyltrimethoxysilane. A portion of the RTV formulation was allowed to cure under atmospheric conditions and it was found to have a tack free time of 15 minutes. Another portion of the RTV composition was heat aged for 120 hours at 70° C. It was found to have a tack free time of 30 minutes.

EXAMPLE 4

As shown in copending application Ser. No. 644,892 now U.S. Pat. No. 4,554,310, filed concurrently herewith, the compositions of the present invention can be rendered less corrosive to copper when in contact with copper under ambient conditions over an extended period of time as follows:

An RTV base formulation was prepared by mixing together under substantially anhydrous conditions 100 parts by weight of a methyldimethoxysiloxy terminated polydimethylsiloxane having a viscosity of 40,000 centipoises at 25° C., 0.3 part of dibutylamine, 30 parts of a trimethoxysiloxy terminated polydimethylsiloxane having a viscosity of 100 centipoise at 25° C., 17 parts of fumed silica and 1.4 part of β-cyanoethyltrimethoxysilane.

RTV formulations were prepared by blending together under substantially anhydrous conditions 100 parts of the base polymer mixture, 0.35 part of dibutyltin(diethylmalonate) and 0.30 part of methyltrimethoxysilane (mixture 1). A mixture of 100 parts of the base polymer was also blended with 0.30 part of dibutyltindiethylmalonate, 0.13 part of benzotriazole and 0.30 part of methyltrimethoxysilane (mixture 2). A third mixture was prepared employing 100 parts of the base polymer, 0.37 part of dibutyltindiethylmalonate, 0.02 part of Reomet 39, a Ciba-Giegy benzotriazole derivative, and 0.66 part of methyltrimethoxysilane (mixture 3).

The above three formulations were blended under substantially anhydrous conditions and were mixed for 15 minutes in a Semco mixer. Five grams of each of the RTV formulations were applied to the surface of a 2"×2" section of clean copper metal. The RTV's were allowed to cure for 7 days while in contact with the copper metal surface. The samples were then heated to 120° F. in a 95% relative humidity environment for 28 days. A portion of the RTV sample was then removed from each of the copper substrates and the exposed substrate was visually examined for corrosion. It was found that the RTV made from mixture 1 left a blue film on the copper indicating that corrosion of the copper surface had occurred. There was no evidence of any change in the surface of the copper as shown by a clean metallic appearance of the RTV samples which were formed from mixture 2 and 3.

EXAMPLE 5

An RTV base formulation was prepared by thoroughly mixing under substantially anhydrous conditions, 100 parts of a dimethoxymethylsiloxy endcapped, polydimethylsiloxane having a viscosity of 100,000 centipoise at 25° C., 1.4 part of methyltrimethoxysilane, 16 parts of fumed silica filler, and 16 parts of a trimethylsiloxy-terminated polydimethylsiloxane having a viscosity of 100 centipoise at 25° C.

The above base formulation was divided into two equal parts. There was added to one of the parts, under substantially anhydrous conditions, 0.25 part of methyltrimethoxysilane, 1 part of β-cyanoethyltrimethoxysilane, 0.25 part of diisobutylamine and 0.25 part of dibutyltin (diethylmalonate). The resulting RTV was blended for 15 minutes under substantially anhydrous conditions in a Semco mixer. The same procedure was repeated except that no diisobutylamine was added to the mixture.

The two RTV mixtures were then exposed to atmospheric moisture. It was found that the RTV containing the diisobutylamine cured to a tack-free state in 60 minutes and to a rubber with excellent elastomeric properties in 7 days. However, the RTV which was free of the diisobutylamine, did not cure to a tack-free state in 24 hours and did not form an elastomer after a seven day shelf period.

EXAMPLE 6

An RTV base formulation was prepared by thoroughly mixing under substantially anhydrous conditions, 250 grams of a methyldimethoxy endcapped polydimethylsiloxane, 2.5 grams of methyltrimethoxysilane, and 1 gram of dibutyltinadipate.

The above silicon composition was divided into 4 50-gram aliquots, each representing a hundred parts of a room temperature vulcanizable base mixture. There was separately added to each of three of the aliquats, 0.05 part, 0.1 part, and 0.25 part of hexylamine. The respective room temperature vulcanizable art formulations were then exposed to ambient atmospheric moisture and the following cure times (TFT) were observed:

| Amine (parts) | Tack-Free Time (hours) |
|---|---|
| 0 | no cure in 24 hours |
| 0.05 | 10 |
| 0.1 | 2 |
| 0.25 | 1½ |

The above results show that a satisfactory cure is obtained when an amine accelerator is utilized in combination with the dibutyltinadipate for effecting the cure of the RTV formulation.

Although the above examples are directed to only a few of the very many variables which can be utilized in making the room temperature vulcanizable composition of the present invention, it should be understood that the room temperature vulcanizable compositions of the present invention can be formulated from a much broader variety of tin dicarboxylate salts as shown by formula (1), silanol terminated polydiorganosiloxanes as shown by formula (2), polyalkoxysilanes as shown by formula (3) and all of the other ingredients shown in the description preceding this example.

What is claimed is:

1. A stable, moisture curable room temperature vulcanizable organopolysiloxane composition substantially free of organic solvent and scavenger for hydroxy functional material which is capable of substantially maintaining the same tack-free time as when freshly mixed after and extended shelf period at ambient conditions in a moisture-resistant moisture free container, comprising by weight:
   (A) 100 parts of a polydiorganosiloxane having terminal polyalkoxy siloxy units,
   (B) 0.1 to 10 parts of a polyalkoxy silane,
   (C) 0.05 to 5 parts of an amine accelerator selected from the class consisting of primary amines, secondary amines, silyl-substituted alkyl guanidines and alkyl-substituted guanidines,
   (D) up to 700 parts of filler, and
   (E) an effective amount of a tin carboxylate condensation catalyst selected from the class consisting of di-n-butyltindiethylmalonate, di-n-octyltindiethylmalonate, di-n-octyltinsuccinate, di-n-octyltinoxylate, di-n-butyltinhexahydrophthalate, di-n-butyltinglutamate, di-n-butyltin(2-cyanoglutarate), and di-n-pentyltinphthalate.

2. A composition in accordance with claim 1, where the carboxylate tin catalyst is di-n-butyltindiethylmalonate.

3. A composition in accordance with claim 1, where the tin catalyst is di-n-octyltindiethylmalonate.

4. A composition in accordance with claim 1, where the tin catalyst is di-n-octyltinsuccinate.

5. A composition in accordance with claim 1, where the tin catalyst is di-n-octyltinoxylate.

6. A composition in accordance with claim 1, where the tin catalyst is di-n-butyltinhexahydrophthalate.

7. A composition in accordance with claim 1, where the tin catalyst is di-n-butyltinglutamate.

8. A composition in accordance with claim 1, where the tin catalyst is di-n-butyltin(2-cyanoglutarate).

9. A composition in accordance with claim 1, where the tin catalyst is di-n-pentyltinphthalate.

10. A stable, moisture curable room temperature vulcanizable organopolysiloxane composition useful as a construction sealant and caulking compound which is substantially free of organic solvent and scavenger for hydroxy functional material consisting essentially of by weight
- (A) 100 parts of a silanol terminated polydiorganosiloxane,
- (B) 0.1 to 10 parts of a polyalkoxy silane,
- (C) 0.05 to 5 parts of an amine accelerator selected from the class consisting of primary amines, secondary amines, silyl-substituted alkyl guanidines and alkyl-substituted guanidines,
- (D) up to 700 parts of filler, and
- (E) an effective amount of a tin dicarboxylate condensation catalyst selected from the class consisting of di-n-butyltindiethylmalonate, di-n-octyltindiethylmalonate, di-n-octyltinsuccinate, di-n-octyltinoxylate, di-n-butyltinhexahydrophthalate, di-n-butyltinglutamate, di-n-butyltin(2-cyanoglutarate), di-n-pentyltinphthalate, and dimethyltinadipate.

11. A composition in accordance with claim 10, where the tin catalyst is di-n-butyltindiethylmalonate.

12. A composition in accordance with claim 10, where the tin catalyst is di-n-octyltindiethylmalonate.

13. A composition in accordance with claim 10, where the tin catalyst is di-n-octyltinsuccinate.

14. A composition in accordance with claim 10, where the tin catalyst is di-n-octyltinoxylate.

15. A composition in accordance with claim 10, where the tin catalyst is di-n-butyltinhexahydrophthalate.

16. A composition in accordance with claim 10, where the tin catalyst is di-n-butyltinglutamate.

17. A composition in accordance with claim 10, where the tin catalyst is di-n-butyltin(2-cyanoglutarate).

18. A composition in accordance with claim 10, where the tin catalyst is di-n-pentyltinphthalate.

19. A composition in accordance with claim 10, where the tin catalyst is dimethyltinadipate.

20. A stable, moisture curable room temperature vulcanizable organopolysiloxane composition substantially free of organic solvent and scavenger for hydroxy functional material which is capable of substantially maintaining the same tack-free time as when freshly mixed after an extended shelf period at ambient conditions in a moisture-resistant moisture free container, comprising by weight:
- (A) 100 parts of a polydiorganosiloxane having terminal polyalkoxy siloxy units,
- (B) 0.1 to 10 parts of a polyalkoxy silane,
- (C) 0.05 to 5 parts of an amine accelerator selected from the class consisting of primary amines secondary amines, silyl-substituted alkyl guanidines and alkyl-substituted guanidines,
- (D) up to 700 parts of filler, and
- (E) an effective amount of a tin dicarboxylate condensation catalyst having the formula

where Y is a dicarboxylate group having the formula,

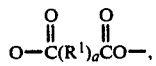

R is selected from $C_{(1-18)}$ monovalent hydrocarbon radicals and substituted $C_{(1-18)}$ monovalent hydrocarbon radicals, $R^1$ is a $C_{(3-9)}$ dialkyl substituted methylene, and a is a whole number having a value of 0 or 1.

21. A stable, moisture curable room temperature vulcanizable organopolysiloxane composition useful as a construction sealant and caulking compound which is substantially free of organic solvent and scavenger for hydroxy functional material consisting essentially of by weight
- (A) 100 parts of a silanol terminated polydiorganosiloxane,
- (B) 0.1 to 10 parts of a polyalkoxy silane,
- (C) 0.05 to 5 parts of an amine accelerator selected from the class consisting of primary amines, secondary amines, silyl-substituted alkyl guanidines and alkyl-substituted guanidines,
- (D) up to 700 parts of filler, and
- (E) an effective amount of a tin dicarboxylate condensation catalyst having the formula

where Y is a dicarboxylate group having the formula,

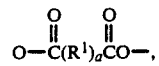

R is selected from $C_{(1-18)}$ monovalent hydrocarbon radicals and substituted $C_{(1-18)}$ monovalent hydrocarbon radicals, $R^1$ is a $C_{(3-9)}$ dialkyl substituted methylene, and a is a whole number having a value of 0 or 1.

* * * * *